United States Patent [19]

Thomas

[11] Patent Number: 4,785,965
[45] Date of Patent: Nov. 22, 1988

[54] APPARATUS FOR STORING PRESSURIZED MATERIALS

[75] Inventor: Larry D. Thomas, Beatrice, Nebr.
[73] Assignee: Hoover Group, Inc., Roswell, Ga.
[21] Appl. No.: 75,423
[22] Filed: Jul. 20, 1987
[51] Int. Cl.⁴ ............................................. B65D 45/00
[52] U.S. Cl. .................................... 220/316; 220/314
[58] Field of Search ................ 220/315, 314, 316, 318

[56] References Cited
U.S. PATENT DOCUMENTS
1,821,726  9/1931  Saporta .............................. 220/316

Primary Examiner—George T. Hall
Attorney, Agent, or Firm—Harness, Dickey & Pierce

[57] ABSTRACT

A tank having a top surface with a top opening bounded by an upwardly extending tubular neck and a lid. A seal member on the lid is in sealing engagement with the neck inner surface so that the lid can move up and down without losing the seal. A lid retaining member is mounted on the top surface of the tank so as to retain the lid in a position in which the sealing engagement is maintained when the interior of said tank is pressurized so as to urge the lid upwardly and structure is provided for insuring against inadvertent removal of the retaining member.

8 Claims, 2 Drawing Sheets

APPARATUS FOR STORING PRESSURIZED MATERIALS

BACKGROUND OF THE INVENTION

1. Field of the Invention

This invention relates to the field of storage and dispensing vessels, and more particularly to apparatus for storing and dispensing materials under pressure.

2. Description of Related Art

Materials such as soft drink syrup are often stored in and dispensed from vessels which are pressurized to facilitate dispensing. These vessels often comprise a tank having an opening over which a lid can be secured. Before shipping, the material is initially placed in the tank through the opening when the tank is unpressurized. The lid is then placed over the opening so that the material remains in the tank throughout shipping. When the material is to be dispensed, the tank is pressurized by introducing a gas such as carbon dioxide into the tank. The increase in pressure inside the tank causes the material to be forced through a valve in the tank which regulates the flow of material.

Various lid structures have been used with such tanks in the past including lids with threads which engaged corresponding threads in the neck of the tank. To either remove or secure the lids, the lid had to be rotated relative to the tank. Such lid structures are not totally satisfactory particularly when the pressure in the tank was relatively high.

SUMMARY OF THE INVENTION

Accordingly, it is the primary object of the present invention to provide a method and apparatus for storing material under pressure having a lid which can be mounted on the tank and maintained in a locked position in sealing engagement with the tank by simply inserting the lid in the tank opening.

It is a further object of the present invention to provide a method and apparatus for storing material under pressure in which the lid can be removed from the tank without requiring rotation of the lid.

A further object of the present invention is to provide a method and apparatus for storing material under pressure in which the lid of the tank can be easily removed when the pressure inside the vessel is low, yet able to secure the lid to the tank when the pressure is high.

These and other objects of the present invention are achieved by providing an apparatus for storing material under pressure comprising a tank operable to store the material, the tank having an opening to receive the material. The apparatus further comprises a lid operable to cover the opening in the tank to allow the tank to be pressurized. The apparatus also comprises a retainer means such as a bail, for securing the lid to the tank, the retainer being operable to prevent removal of the lid when the tank is pressurized.

BRIEF DESCRIPTION OF THE DRAWINGS

Various advantages of the present invention will become apparent to one skilled in the art upon reading the following specification and by references to the following drawings in which.

DESCRIPTION OF THE PREFERRED EMBODIMENT

Figure 1:
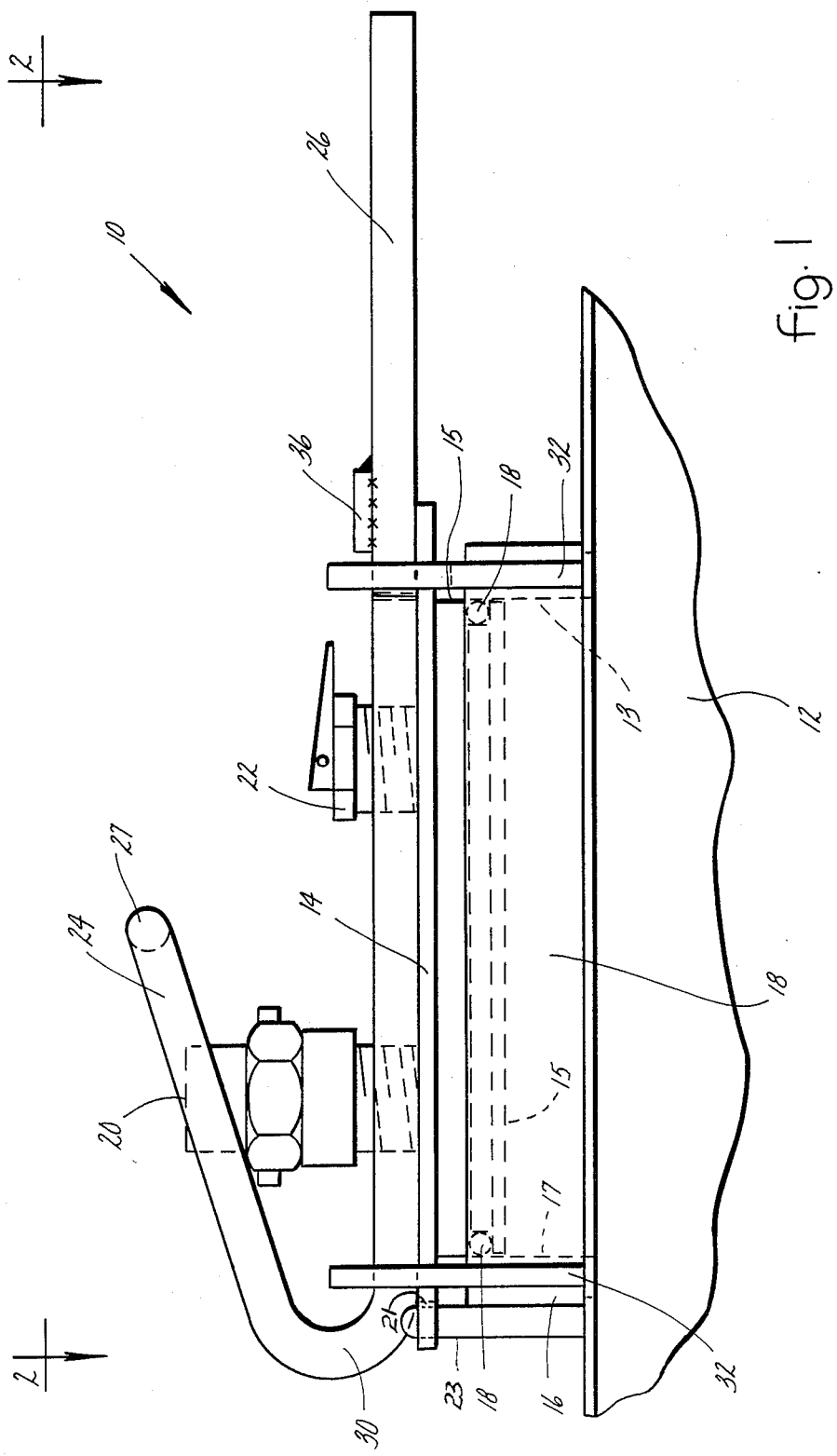
FIG. 1 is a front elevational view of the top portion of the apparatus for storing material under pressure according to the teachings of the preferred embodiment of the present invention.

Referring to FIG. 1, an apparatus 10 for storing material under pressure is shown. The apparatus 10 comprises a tank 12 and a lid 14. The tank 12 includes a neck 16 which forms an opening 13 through which the material to be stored can be deposited. The neck 16 is tubular in shape having a cylindrical inner surface 17. The tank 12 may be used to store syrup for soft drink beverages, though it is to be understood that the tank 12 may store other suitable materials. The lid 14 has a cylindrical projection 15 which extends downwardly into the neck 16 and has an annular seal 18 mounted thereon. The seal 18 is formed of a resilient material such as rubber and is sealingly engaged with the surface 17 in various vertically moved positions of the lid 14. The seal 18 engages the surface 17 to prevent pressurized gases in the tank 12 from escaping through the neck.

The lid 14 also includes a pressure fitting 20 which is used to permit pressurized gas such as carbon dioxide to be introduced into the tank 12 so that the material in the tank 12 can be pressurized. In addition, the lid 14 carries a vent fitting 22 which is used to selectively depressurize the tank 12.

According to the preferred embodiment of the present invention, the apparatus comprises a tank operable to store material, the tank having an opening for receiving the material. The apparatus further comprises a lid operable to cover the opening. The apparatus also comprises means for securing the lid to the tank operable to prevent removal of the lid when the tank is pressurized. Because the means for securing the lid 14 to the tank 12 is operable to prevent removal of the lid 14 when the tank 12 is pressurized, the apparatus 10 does not require threaded engagement between the lid 14 and the tank 12 to secure the lid 14. In addition, it will be seen that the lid may be removed from the tank 12 without requiring rotation of the lid 14 relative to the tank 12.

To provide means for securing the lid 14 to the tank 12, a bail 24 is provided. The bail 24 consists of continuous elongated bar member 25 of irregular shape having two longitudinal side sections 26 and 28 each of which has an upwardly curved portion 30 at one end. A generally straight section 27 connects the curved portions 30 and thus also connects the sections 26 and 28 at a position above the sections 26 and 28.

To maintain the bail 24 in a fixed position when the vessel is pressurized, the bail 24 cooperates with a plurality of bail support members 32 which are secured to the tank 12. Each of the bail support members 32 has an opening or slot 34 which is sufficiently large to accommodate the cross-section of the longitudinal side sections 26 and 28. Each slot 34 is vertically elongated to accomodate limited vertical movement of the bail 24 for a purpose to appear presently.

When the side sections 26 and 28 of the bail 24 are inserted through the bail support members 32, the bail 24 prevents removal of the lid 14 after the tank 12 has been pressurized. In addition, the side sections 26 and 28 of the bail 24 can be made from such a material that will allow deformation of the bail 24 when the force exerted by the lid 14 on the bail 24 exceeds a predetermined magnitude due to overpressurization of the tank 12.

Accordingly, when overpressurization of the tank 12 occurs, the bail 24 allows the lid 14 to move a sufficient distance to allow the pressurized gases in the tank 12 to escape while preventing unrestricted movement of the lid 14.

Figure 2:
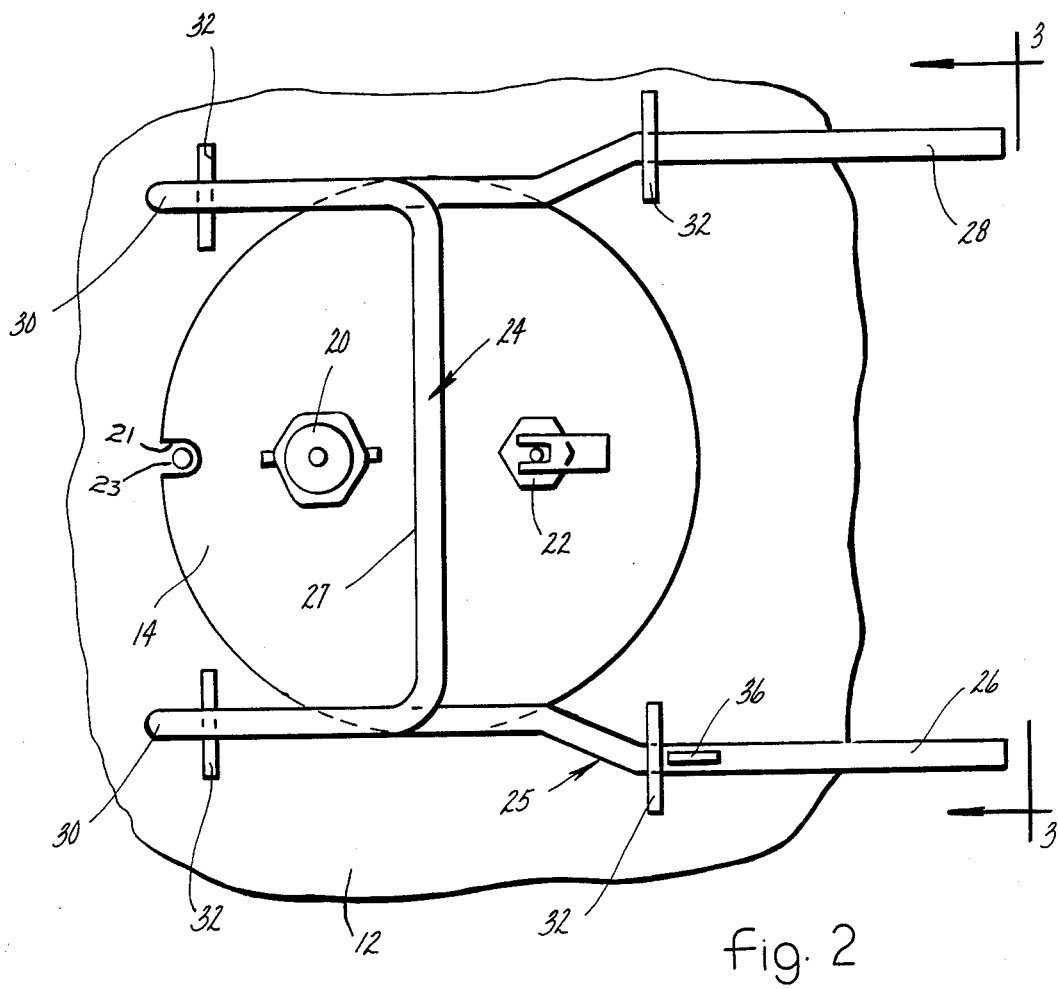
FIG. 2 is a view taken in the direction of arrows 2—2 in FIG. 1.
Figure 3:
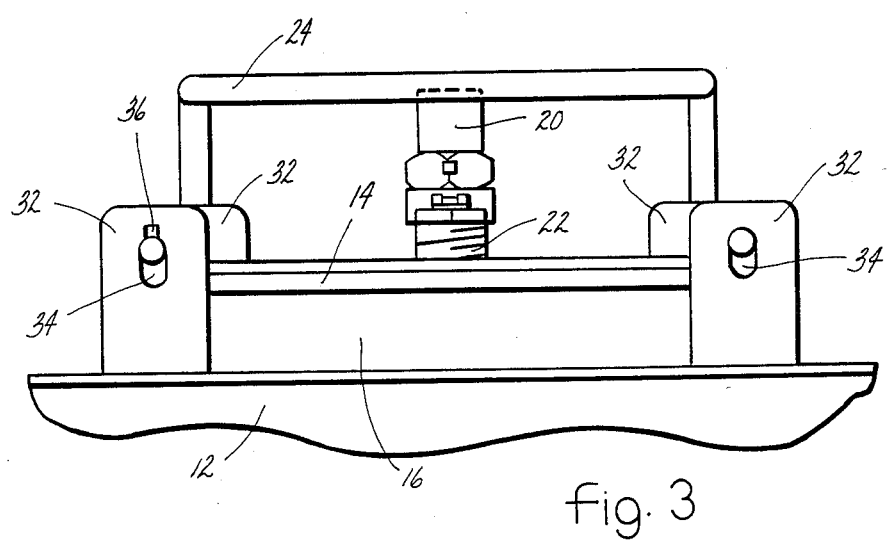
FIG. 3 is a view taken in the direction of arrows 3—3 in FIG. 2.

As shown in FIGS. 1 and 2, the lid 14 is formed in its peripheral edge with a notch 21 which, in the closed position of the lid 14 is aligned with a locating pin or stud 23 which extends through the notch 21. This coaction of notch 21 and stud 23 orients the lid, such that access to the gas fitting 20 is possible only if the bail 24 is fully engaged. Anything less than full engagement of the bail, will leave bail section 27 too close to or over the top of fitting 20, thus preventing connection of pressure to the fitting.

To prevent lateral movement of the bail 24 when the tank 12 is pressurized, the bail 24 includes a lock member 36. The lock member 36 is disposed on the side section 26 and is located so that it engages one of the bail support members 32 when the bail 24 is laterally displaced after the tank 12 has been pressurized. Accordingly, the lock member 36 prevents movement of the bail 24 in a horizontal direction by engaging one of the bail support members 32. In addition, the curved portions 30 of the longitudinal members 26 and 28 will engage two of the bail support members 32 to prevent movement of the bail 24 in the opposite direction.

In the use of the apparatus of this present invention, the material which is to be stored and dispensed is deposited in the tank 12 through the neck 16. The lid 14 is then placed over the opening 18 so that the tank 12 can be pressurized. The bail 24 is then inserted through the bail support members 32 so that the bail 24 is located proximate to the lid 14 thereby preventing removal of the lid 14. Pressurized gases are then introduced into the tank 12 through the pressure fitting 20 causing the lid 14 and the bail 24 to rise vertically in the slots 34 to a position where further vertical movement is prevented by the bail support members 32. When the tank 12 has been so pressurized, removal movement of the bail 24 is prevented by the lock member 36 and the curved portions 30 of the bail 24.

As shown in FIG. 2 the bail side sections 26 and 28 overlie diametrically spaced portions of the lid 14 so as to firmly secure the lid in a closed position without interfering with the fittings 20 and 22. The bail portion 27 extends diametrically across the lid 14 at a position above the lid 14 to enable its use as a handle in installing and removing the bail 24.

It should be understood that the present invention was described in connection with one specific embodiment. Other modifications will become apparent to one skilled in the art upon studying the specification, drawings and the claims.

I claim:

1. Apparatus for containing material under pressure comprising:
    a tank for said material, said tank having a tubular neck at its upper end providing an opening to receive said material;
    a lid operable to close the opening and having an extension extending downwardly in said neck in sealing engagement therewith to thereby enable said tank to be pressurized;
    retaining means removably mounted on said tank directly above and adjacent said lid for engagement with said lid to prevent removal of the lid when said tank is pressurized; and
    coacting means on said tank and said retaining means operable to prevent movement of said retaining means when said tank is pressurized, said coacting means being operable by upward movement of said lid while maintaining said sealing engagement of said lid with said neck.

2. Apparatus according to claim 1 wherein said retaining means comprises a bail member operable to prevent removal of said lid when said tank is pressurized, and being removable to enable removal of said lid when said tank is unpressurized.

3. The apparatus of claim 2 wherein said apparatus further includes bail support members on said tank, said coacting means being on said support members and said bail.

4. In a tank having a top surface with an upwardly extending tubular neck, said neck having a cylindrical inner surface, a lid on said neck having a cylindrical extension extending downwardly into said neck, a seal member on said extension in sealing engagement with said neck inner surface, a lid retaining member mounted on said top surface so as to retain said lid in a position in which said sealing engagement is maintained when the interior of said tank is pressurized so as to urge said lid upwardly, said retaining member having sections thereof located directly above and adjacent diametrically spaced portions of said lid, mounting members for said retaining member on said tank top surface, said mounting members enabling removal of said retaining member therefrom by movement of the retaining member in a generally horizontal direction and enabling movement of said retaining member upwardly to a locked position in response to upward movement of said lid to a predetermined position, said retaining member in said locked position preventing removal of said lid, said lid being removable from said neck only when said retaining member is removed from said mounting members.

5. The structure according to claim 4 wherein said retaining member is a bail formed from a bar member configured to have generally straight spaced side sections and a connecting portion extending upwardly from one end of the side sections.

6. The structure according to claim 5 wherein said mounting members comprise upwardly extending plates having upright slots therein of a size to accommodate said bail side sections and enable said side sections to move upwardly therein.

7. The structure according to claim 6 further including a locking member on at least one of said side sections engageable with a mounting plate to prevent withdrawal of said bail from said mounting plates when said lid has been moved upwardly by tank pressure to in turn move the bail upwardly to the upper ends of said slots.

8. Apparatus for containing material under pressure comprising:
    a tank for material, said tank having a tubular neck at its upper end providing an opening to receive said material;
    a lid operable to close the opening and having an extension extending downwardly in said neck in sealing engagement therewith to thereby enable said tank to be pressurized;
    a bail member mounted on said tank directly above and adjacent said lid for engagement with said lid to prevent removal of said lid when said tank is pressurized, and being removable to enable removal of said lid when said tank is unpressurized;

bail support members on said tank and coacting means on said support members and said bail operable to prevent movement of said bail when said tank is pressurized;

said bail comprising a shaped bar member having parallel side sections which overlie diametrically spaced portions of said lid and a connecting portion extending upwardly therefrom and forming a handle to facilitate manipulation of said side sections.

* * * * *